United States Patent
Chen et al.

(10) Patent No.: US 11,657,507 B2
(45) Date of Patent: May 23, 2023

(54) IMAGE DATA PROCESSING METHOD AND PRINTING SYSTEM FOR PRINTING TECHNOLOGY

(71) Applicant: Zhuhai Sailner 3D Technology Co., Ltd., Guangdong (CN)

(72) Inventors: Wei Chen, Guangdong (CN); Dongqing Xiang, Guangdong (CN); Linting Xie, Guangdong (CN)

(73) Assignee: ZHUHAI SAILNER 3D TECHNOLOGY CO., LTD., Guangdong (CN)

( * ) Notice: Subject to any disclaimer, the term of this patent is extended or adjusted under 35 U.S.C. 154(b) by 640 days.

(21) Appl. No.: 16/685,118

(22) Filed: Nov. 15, 2019

(65) Prior Publication Data
US 2020/0082537 A1 Mar. 12, 2020

Related U.S. Application Data

(63) Continuation of application No. PCT/CN2018/085450, filed on May 3, 2018.

(30) Foreign Application Priority Data

May 23, 2017 (CN) .......................... 201710369120.2

(51) Int. Cl.
*G06T 15/00* (2011.01)
*G06T 7/11* (2017.01)
(Continued)

(52) U.S. Cl.
CPC .............. *G06T 7/11* (2017.01); *B29C 64/386* (2017.08); *G06T 7/143* (2017.01); *G06T 7/62* (2017.01);
(Continued)

(58) Field of Classification Search
CPC ......... G06T 7/73; G06T 7/62; G06T 2200/04; G06T 2207/20168; G06T 7/143;
(Continued)

(56) References Cited

U.S. PATENT DOCUMENTS 5,644,758 A 7/1997 Raymond
7,085,017 B1 8/2006 Jones
(Continued)

FOREIGN PATENT DOCUMENTS

CN 1994751 A 7/2007
CN 104626585 A 5/2015
(Continued)

OTHER PUBLICATIONS

Huang Q, Nouri H, Xu K, Chen Y, Sosina S, Dasgupta T. Predictive modeling of geometric deviations of 3d printed products—a unified modeling approach for cylindrical and polygon shapes. In2014 IEEE International Conference on Automation Science and Engineering (CASE) Aug. 18, 2014 (pp. 25-30). IEEE.*
(Continued)

*Primary Examiner* — Phu K Nguyen
(74) *Attorney, Agent, or Firm* — Carlson, Gaskey & Olds, P.C.

(57) ABSTRACT

An image data processing method and a printing system for printing technology are provided. The image includes a first bitmap image. The image data processing method includes: dividing the first bitmap image into a plurality of regions, selecting sampling positions in each of the plurality of regions, performing sampling to acquire sample points, and rearranging the sample points to form a second bitmap image. The second bitmap image is different from the first bitmap image.

24 Claims, 8 Drawing Sheets

---

S201: Dividing the first bitmap image into multiple circumferences whose radii are not equal to each other and whose centers coincide, i.e., all circumferences are concentric circles, and performing sampling on each circumference S202: A sampling coordinate of the sampling position being $((r-n*\varepsilon r)*\cos(m*\theta), (r-n*\varepsilon r)*\sin(m*\theta))$ S203: Arranging sample points on each circumference in rows and sample points located on different circles and having a same $\theta$ in columns, so as to form a second bitmap image

(51) Int. Cl.
*G06T 7/62* (2017.01)
*G06T 7/143* (2017.01)
*G06T 7/73* (2017.01)
*B29C 64/386* (2017.01)
*G06T 19/20* (2011.01)

(52) U.S. Cl.
CPC ............... *G06T 7/73* (2017.01); *G06T 19/20* (2013.01); *G06T 2200/04* (2013.01); *G06T 2207/20168* (2013.01); *G06T 2219/2008* (2013.01)

(58) Field of Classification Search
CPC ... G06T 7/11; G06T 19/20; G06T 2219/2008; B29C 64/386; B29C 64/393; B33Y 30/00; B33Y 50/00; B33Y 50/02
USPC .......................................................... 345/418
See application file for complete search history.

(56) References Cited

U.S. PATENT DOCUMENTS

| | | | |
|---|---|---|---|
| 9,881,399 B2* | 1/2018 | Peev | G06T 11/206 |
| 9,998,723 B2* | 6/2018 | Supikov | H04N 13/128 |
| 10,318,803 B1* | 6/2019 | Agarwal | G06T 11/20 |
| 10,379,032 B2* | 8/2019 | Godfrey | G06V 20/647 |
| 10,919,213 B2* | 2/2021 | Jiang | B29C 64/205 |
| 11,207,822 B2* | 12/2021 | Chen | B33Y 10/00 |
| 11,257,296 B2* | 2/2022 | Sumi | G06F 3/1256 |
| 2008/0042321 A1* | 2/2008 | Russell | B33Y 30/00 15/4 |
| 2015/0309494 A1* | 10/2015 | Kobayashi | B33Y 50/00 700/98 |
| 2016/0046076 A1 | 2/2016 | Huang et al. | |
| 2016/0096319 A1 | 4/2016 | Donaldson et al. | |
| 2016/0221267 A1 | 8/2016 | John et al. | |

FOREIGN PATENT DOCUMENTS

| | | | | |
|---|---|---|---|---|
| CN | 104723560 A | 6/2015 | | |
| CN | 105034359 A | 11/2015 | | |
| CN | 105216306 A | 1/2016 | | |
| CN | 105904729 A | 8/2016 | | |
| CN | 107471648 A | 12/2017 | | |
| EP | 3166774 A1 * | 5/2017 | ........... | B29C 64/112 |
| EP | 3166774 A1 | 5/2017 | | |
| JP | 2003141533 | 5/2003 | | |
| JP | 2016074205 | 5/2016 | | |
| JP | 2017507050 | 3/2017 | | |
| WO | 2014/197732 A2 | 12/2014 | | |
| WO | 2016/180842 A1 | 11/2016 | | |
| WO | 2017/009830 | 1/2017 | | |

OTHER PUBLICATIONS

Kelly BE, Bhattacharya I, Heidari H, Shusteff M, Spadaccini CM, Taylor HK. Volumetric additive manufacturing via tomographic reconstruction. Science. Mar. 8, 2019;363(6431):1075-9.*
Navarro R, Arines J, Rivera R. Direct and inverse discrete Zernike transform. Optics express. Dec. 21, 2009;17(26):24269-81.*
Portilla J, Barbero S. Accuracy of geometric point spread function estimation using the ray-counting method. InOptical Systems Design 2012 Dec. 18, 2012 (vol. 8550, pp. 12-23). SPIE.*
Zhu D, Zhu Z. Range resampling in the polar format algorithm for spotlight SAR image formation using the chirp $ z $-transform. IEEE Transactions on Signal Processing. Feb. 12, 2007;55(3):1011-23.*
Rasche V, Proksa R, Sinkus R, Bornert P, Eggers H. Resampling of data between arbitrary grids using convolution interpolation. IEEE transactions on medical imaging. May 1999;18(5):385-92.*
Ghosh S, Johnson MV, Neupane R, Hardin J, Berrigan JD, Kalidindi SR, Kong YL. Machine learning-enabled feature classification of evaporation-driven multi-scale 3D printing. Flexible and Printed Electronics. Mar. 1, 2022;7(1):014011.*
Hou JU, Kim DG, Lee HK. Blind 3D mesh watermarking for 3D printed model by analyzing layering artifact. IEEE Transactions on Information Forensics and Security. Jun. 21, 2017;12(11):2712-25.*
Hou JU, Kim DG, Choi S, Lee HK. 3D print-scan resilient watermarking using a histogram-based circular shift coding structure. InProceedings of the 3rd ACM workshop on information hiding and multimedia security Jun. 17, 2015 (pp. 115-121).*
Zhao L, Lee VK, Yoo SS, Dai G, Intes X. The integration of 3-D cell printing and mesoscopic fluorescence molecular tomography of vascular constructs within thick hydrogel scaffolds. Biomaterials. Jul. 1, 2012;33(21):5325-32.*
Jung H, Park J, Yoo J, Ye JC. Radial k-t FOCUSS for high-resolution cardiac cine MRI. Magnetic Resonance in Medicine: An Official Journal of the International Society for Magnetic Resonance in Medicine. Jan. 2010;63(1):68-78.*
International Search Report for International Patent Application No. PCT/CN2018/085450 dated Jul. 11, 2018.
Extended European Search Report for EP Application No. EP 18 80 5012 dated Mar. 19, 2021.
Chinese Office Action for Application No. 2017103691202 dated Mar. 5, 2018.
Japanese Notice of Reasons for Refusal, Application No. 2019-547618 dated Oct. 13, 2020.

* cited by examiner

IMAGE DATA PROCESSING METHOD AND PRINTING SYSTEM FOR PRINTING TECHNOLOGY

CROSS-REFERENCE TO RELATED APPLICATIONS

This application is a continuation of International Application No. PCT/CN2018/085450, filed on May 3, 2018, which claims priority to Chinese Patent Application No. 201710369120.2, filed on May 23, 2017. The disclosures of the aforementioned patent applications are hereby incorporated by reference in their entireties.

TECHNICAL FIELD

The present application relates to the field of rapid prototyping technology, and more particularly, to an image data processing method and a printing system for printing technology.

BACKGROUND

Rapid prototyping technology is also referred to as rapid prototyping manufacturing technology or additive manufacturing technology or 3D printing technology, and its basic principle is to form a 3D print object by slicing based on a 3D model and then processing and stacking layer-by-layer.

A 3D inkjet printer in which a printing head is made of multiple nozzle arranged in an array moves in such a manner that a printing platform moves along an X axis and a Y axis with respect to the printing head and moves to an origin after completing one layer. After the printing platform is lowered by a height of one layer relative to the printing head, an operation for printing a new layer starts, and so on, to form a 3D print object.

Taking movement of a printing head 100 as an example, a movement manner of the 3D inkjet printer is analyzed. Referring to FIG. 1, in an X-axis direction, four stages of acceleration, uniform speed, deceleration, and stop are provided, whereas the printing head only works at the stage of the uniform speed. Thereafter, it moves in the Y axis, and then accelerates, moves at a uniform speed, decelerates, stops in the X axis, until the work for printing one layer is completed, and finally, a print object 200 is formed.

The movement manner of the 3D inkjet printer brings an obvious problem. Since the printing head 100 does not work during the stages of acceleration, deceleration and stop, which results in low printing efficiency, how to effectively improve the printing efficiency is a problem that is highly valued by the industry.

In the related art, a novel 3D inkjet printer with a circular printing platform is presented, and a difference from the movement manner of the X and Y axes of the 3D inkjet printer lies in that the circular printing platform rotates continuously with respect to the printing head, and the printing head works during the rotation, to stack layer-by-layer to form a 3D print object. Compared with the 3D inkjet printer, a printing method for the printer having the circular printing platform skips the three stages of acceleration, deceleration and stop, which can effectively improve the printing efficiency.

The novel printer has also brought a series of problems. One of the problems is that a slice layer of the 3D inkjet printer is a rectangular bitmap image. The printing head moves to print point-by-point, according to positions of pixel points of the rectangular bitmap image corresponding to the X and Y axes. Therefore, if an arrangement and printing is executed on a circular printing platform according to the rectangular bitmap image, it will result in an inconsistent distribution of the pixel points of different radii on the circular printing platform, and the closer to a center point of the circular region, the denser the pixel points, which will eventually cause the print object to be distorted.

SUMMARY

The present application provides an image data processing method and a printing system for printing technology, capable of solving the above problems.

A first aspect of the present application provides a processing method for data on an image, applied in a printing technology, the image includes a first bitmap image; and the processing method for data on the image includes dividing the first bitmap image into a plurality of regions, selecting sampling positions in each of the plurality of regions and performing sampling to acquire sample points and rearranging the sample points to form a second bitmap image, the second bitmap image being different from the first bitmap image.

In some embodiments, an execution manner for dividing the first bitmap image into the plurality of regions, selecting the sampling positions in each of the plurality of regions and performing sampling lies in dividing the first bitmap image into a plurality of circumferences, selecting the sampling positions on each of the plurality of circumferences along a circumferential direction of the circumference and performing sampling to acquire the sample points.

In some embodiments, among the plurality of circumferences, at most one of the plurality of circumferences coincides with a largest inscribed circle of the first bitmap image, and rest circumferences of the plurality of circumferences are located within the largest inscribed circle.

In some embodiments, the plurality of circumferences are concentric circles.

In some embodiments, differences in radii of every two adjacent circumferences of the plurality of circumferences are equal.

In some embodiments, on any one of the plurality of circumferences, central angles formed by any two adjacent ones of the sampling positions are equal.

In some embodiments, an execution manner for selecting the sampling positions on each of the plurality of circumferences and performing sampling to acquire the sample points lies in: selecting a same number of sampling positions on each of the plurality of circumference and performing sampling to acquire a same number of sample points.

In some embodiments, for each of the plurality of circumferences, a number of sampling positions on the circumference is $N=2\pi r*P/25.4$, where P is a resolution of a print target and r is a radius of a largest inscribed circle of the first bitmap image.

In some embodiments, an execution manner for selecting the sampling positions on each of the plurality of circumferences and performing sampling to acquire the sample points lies in: selecting a different number of sampling positions on each of the plurality of circumferences and performing sampling to acquire a different numbers of sample points.

In some embodiments, when selecting a different number of sampling positions on each of the plurality of circumferences and performing sampling to acquire a different number of sample points, along a radial direction of a largest inscribed circle of the first bitmap image, a variation trend of numbers of sampling positions selected on the plurality of circumferences is consistent with a variation trend of radii of the plurality of circumferences.

In some embodiments, when selecting a different number of sampling positions on each of the plurality of circumferences and performing sampling to acquire a different numbers of sample points, for each of the plurality of circumferences, along the radial direction of the largest inscribed circle, a number of sampling positions selected on the circumference is proportional to a radius of the circumference.

In some embodiments, for each of the plurality of circumferences, the number of the sampling positions on the circumference is $N=2\pi r'*P/25.4$, where P is a resolution of a print target and is a radius of the circumference.

In some embodiments, said rearranging the sample points to form the second bitmap image includes rearranging the sample points in such a manner that sample points located on a same circumference are arranged in one row and sample points located on different circumferences and located in a same radial direction of a largest inscribed circle of the first bitmap image are arranged in one column, so as to form the second bitmap image.

In some embodiments, said rearranging the sample points in such a manner that sample points located on a same circumference are arranged in one row and sample points located on different circumferences and located in a same radial direction of the largest inscribed circle are arranged in one column so as to form the second bitmap image includes:

rearranging the sample points in such a manner that the sample points located on the same circumference are arranged in one row and the sample points located on different circumferences and located in the same radial direction of the largest inscribed circle are arranged in one column, so as to form the second bitmap image of M*N, where M indicates a row, N indicates a column, and M and N are positive integers; and the method further includes supplementing one or more blank points when a number of sample points in each row is smaller than N, so that a sum of a number of the one or more blank points and the number of the sample points in the row is equal to N, wherein at each of the one or more blank points, a printing head does not execute an inkjet printing operation.

In some embodiments, said supplementing the one or more blank points when the number of the sample points in the row is smaller than N is executed in one of following manners:

supplementing the one or more blank points after the sample points; supplementing the one or more blank points before the sample points; and arranging the sample points and the one or more blank points alternately.

In some embodiments, an execution manner for dividing the first bitmap image into the plurality of regions, selecting the sampling positions in each of the plurality of regions and performing sampling lies in dividing the first bitmap image into a plurality of radii, selecting the sampling positions on each of the plurality of radii along a radial direction of a largest inscribed circle of the first bitmap image and performing sampling to acquire the sample points, wherein each of the plurality of radii is a radius of the largest inscribed circle of the first bitmap image.

In some embodiments, said rearranging each of the sample points to form the second bitmap image includes forming the second bitmap image in such a manner that each sampling point in a same radial direction of the largest inscribed circle is arranged in one column and all sample points, which are located on different radii of the plurality of radii and whose sampling positions have equal distances from a center of the largest inscribed circle, are arranged in one row, so as to form the second bitmap image.

In some embodiments, when selecting sampling positions on each of the plurality of radii along the radial direction of the largest inscribed circle and performing sampling to acquire the sample points, numbers of sampling positions selected on different radii are equal.

In some embodiments, for each of the plurality of the radii, a number of sampling positions on the radius is $k=r*P/25.4$, where r is a radius of the largest inscribed circle and P is a resolution of a print target.

In some embodiments, if a sampled data point is a data point that has been sampled, the sample point is a blank point, wherein at the blank point, a printing head does not execute an inkjet printing operation.

In some embodiments, the processing method for data on the image further includes, if there is no data point at one of the sampling positions, selecting at least one neighboring point of a region where the sampling position is located as a sample point of the sampling position, the neighboring point being a data point located in at least one side of the region.

In some embodiments, the neighboring point is a data point obtained by any one of following manners: a data point at a coordinate position obtained by rounding a coordinate of the sampling position; a data point at a coordinate position obtained by rounding-up or rounding-down a coordinate of the sampling position; or a data point at a coordinate position obtained by weighting coordinates of positions where a plurality of neighboring points are located.

In some embodiments, the first bitmap image is a rectangular bitmap image; and the second bitmap image is a bitmap image uniformly distributing in each of the plurality of regions.

A second aspect of the present application provides a printing system using the processing method for data on the image in any one the aspects above, the image includes a first bitmap image, and the printing system includes a printing device and a data processing device, the data processing device is configured to divide the first bitmap image into a plurality of regions, select sampling positions in each of the plurality of regions, perform sampling to acquire sample points, and rearrange the sample points to form a second bitmap image; and the printing device includes a printing head and a printing platform, and the printing platform is rotatable relative to the printing head about an axis perpendicular to a printing surface; and the printing head is configured to form a print object on the printing platform based on the second bitmap image.

The technical solutions provided by the present application can achieve the following beneficial effects.

The processing method for data on the image provided by the present application divides the first bitmap image into a plurality of regions, respectively selects sampling positions in each of the plurality of regions to sample and acquire sample points, and rearranges the sample points to form the second bitmap image. The second bitmap image is composed of the points in the plurality of regions and the points can be arranged according to a movement manner of the printing head, so when the printing head made of multiple nozzle arranged in an array prints circularly, pixel points formed by data of the second bitmap image in a printing result actually distribute in a uniform manner in different regions, thereby avoiding a problem of an inconsistent distribution of the pixel points of different radii, making the printing pixel points distribute as uniformly as possible, and thus improving the printing quality of print objects.

It should be understood that the above general description and following detailed description are merely exemplary and are not intended to limit the present application.

REFERENCE SIGNS

Figure 1:
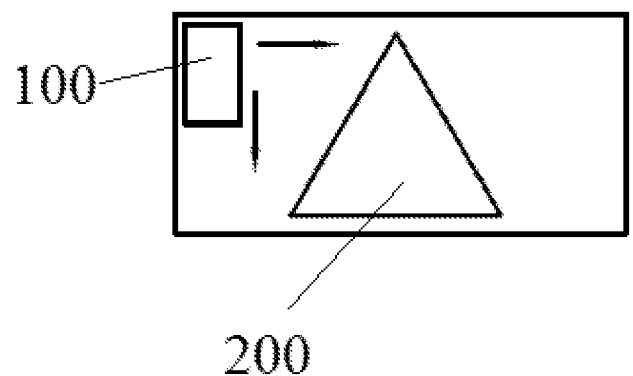
FIG. 1 is a schematic diagram of a printing head of a 3D inkjet printer moving along an X and Y axes with respect to a printing platform in the background.

In FIG. 1:
100-printing head;
200-print object;
In FIGS. 2-17:
1-first bitmap image;
C1-first circumference;
501-first sampling position;
501'-third sampling position;
501"-fourth sampling position;
601-sixth sampling position;
601'-sixth data point;
602-seventh sampling position;
602'-seventh data point;
603-eighth sampling position;
603'-eighth data point;
R1-first radius;
1101-ninth sampling position;
1102-tenth sampling position;
1201-fourteenth sampling position;
1202-fifteenth sampling position;
1203-sixteenth sampling position;
1204-seventeenth sampling position;
1201'-fourteenth data point;
1202'-fifteenth data point;
1203'-sixteenth data point;
1203"-eighteenth data point;
1204'-seventeenth data point;
R2-second radius;
1101'-eleventh sampling position;
1103-thirteenth sampling position;
R3-third radius;
1101"-twelfth sampling position;
C2-second circumference;
502-second sampling position;
C3-third circumference;
503-fifth sampling position;
C4-fourth circumference;
2-second bitmap image;
3-printing device;
31-printing head;
32-printing platform;
4-data processing device.

The drawings herein are incorporated into the specification and constitute a part of this specification, showing embodiments consistent with the present application and used to explain principles of the present application together with the description.

DESCRIPTION OF EMBODIMENTS

The present application will be further described in detail below through specific embodiments and with reference to the accompanying drawings. The image described in the present application is an image formed by converting a target object into a data structure and then slicing and is composed of data points.

Converting the target print object into the data structure can be achieved by, for example, acquiring information of the target object by scanning and then converting the information contained in the target object into a data format that can be recognized by a layering-slicing software of a processing terminal, such as a STL format, a PLY format, a WRL format, and the like. In some embodiments, the information contained in the target object can be in unit of layer. Namely, after the target object is scanned, it is converted, by data conversion, into a data format that can be recognized by the layer slicing software of the processing terminal, and then is sliced and layered by a layering software. Thus, each slice layer is the image described in the present application.

In some embodiments, the image includes a first bitmap image, and multiple data points are obtained by analyzing the first bitmap image of the image. The data points include virtual points and valid points. The virtual point indicates the data point at which a printing head does not respond to work, and the valid point indicates the data point at which the printing head responds to the work. In the present application, the printing head not responding to work indicates that the printing head neither moves past nor performs inkjet printing; and the printing head responding to work includes at least one of the following operation: the printing head only moving past without performing inkjet printing, and the printing head moving past and performing inkjet printing.

Figure 3:
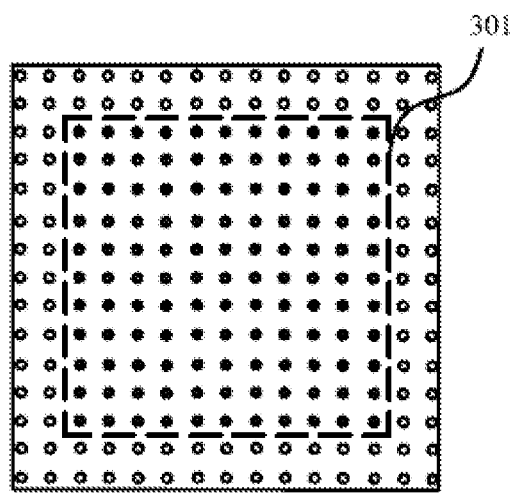
FIG. 3 is a schematic diagram of data points, including valid points and virtual points, on a first bitmap image of the present application.

Referring to FIG. 3, a distribution of the data points of the first bitmap image is shown, in which solid points in a dashed box 301 represent the valid points (i.e., a printing range of the first bitmap image) and hollow points outside the dashed box 301 represent the virtual points. It should be noted that the solid points and the hollow points shown in FIG. 3 are only examples of the valid points and the virtual points, and do not have any limiting effect on drawings mentioned later in the present application.

Figure 13:
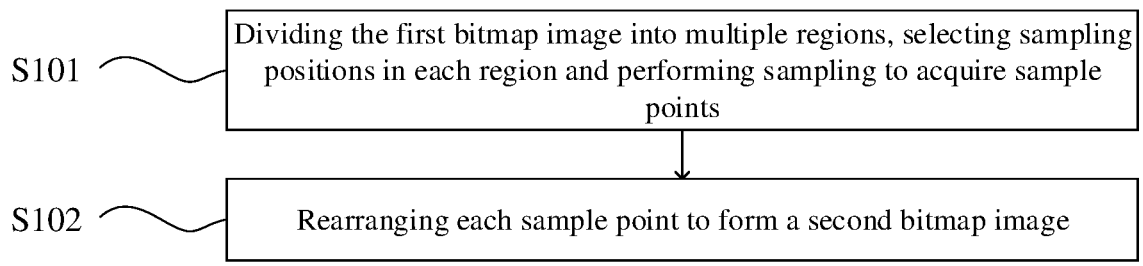
FIG. 13 is a flowchart of an image data processing method provided by the present application.

As shown in FIG. 13, an embodiment of the present application provides an image data processing method for printing technology, including:

S101: dividing the first bitmap image into multiple regions, selecting sampling positions in each region and performing sampling to acquire sample points; and S102: rearranging each sample point to form a second bitmap image.

The image processing method above is used to process the image, i.e., dividing the first bitmap image into multiple regions, respectively selecting the sampling positions in each regions and performing sampling to acquire the sample points, then rearranging the sample points to form the second bitmap image. Since the second bitmap image is composed of the points in each region and the points can be arranged according to a movement manner of the printing head, during a process of printing by the printing head, data of the second bitmap image is actually arranged in a manner of region, such that a problem of an inconsistent distribution of pixel points having different radii is avoided, and thus the pixel points in each regions distribute as uniformly as possible, thereby improving a printing quality of print objects.

Figure 4:
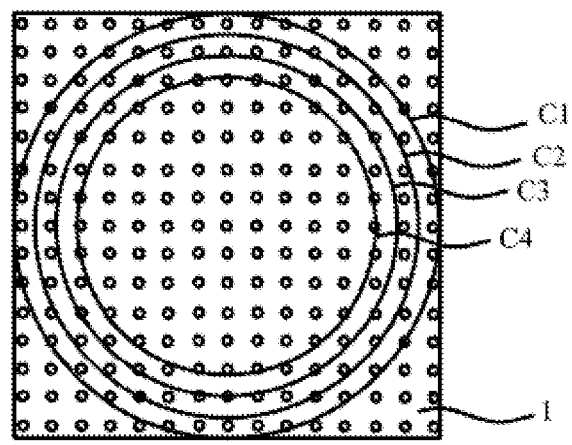
FIG. 4 is a schematic diagram of dividing a first bitmap image into multiple circumferences to sample in Embodiment 1.

In an embodiment, an execution manner of the step S101 is as follows:

dividing the first bitmap image into multiple circumferences, selecting the sampling positions on the circumferences along a circumferential direction of the circumference and performing sampling to acquire the sample points, and in other words, the regions in the step S101 being the circumferences. In some embodiments, among the circumferences, at most one circumference coincides with a largest inscribed circle of the first bitmap image, and rest circumferences are located within the largest inscribed circle. As shown in FIG. 4, the first bitmap image 1 is divided into multiple circumferences. The multiple circumferences are a first circumference C1, a second circumference C2, a third circumference C3, a fourth circumference C4, . . . , where the first circumference C1 is the largest inscribed circle of the first bitmap image 1, and the second circumference C2, the third circumference C3, and the fourth circumference C4 are all located within the largest inscribed circle. The valid points in the present disclosure is located in the largest inscribed circle.

In some embodiments, the circumferences above are concentric circles. Namely, centers of the circumferences coincide, and radii are not equal. The first circumference C1, the second circumference C2, the third circumference C3, and the fourth circumference C4 shown in FIG. 4 are concentric circles, and an arrangement of the concentric circles makes it easy to calculate coordinate values of the sampling positions. Without doubt, centers of the circumferences can also be not coincident.

Differences between radii of every two adjacent circumferences can be equal or unequal. Optionally, the differences between the radii of every two adjacent circumferences are equal to facilitate a calculation of coordinates of each sampling positions.

In order to facilitate the calculation of the coordinates of the sampling position, central angles formed between every two adjacent sampling positions are equal on any one circumference.

The step S101 can be executed in several manners as follows.

A first sampling manner: selecting a same number of sampling positions on all circumferences and performing sampling to acquire a same number of sample points, i.e., a number of sampling positions on all circumferences is the same. For each circumference, the number of sampling positions on the circumference is $N=2\pi r*P/25.4$.

In this case, for each sampling position, a coordinate of the sampling position is $((r-n*\Delta r)*\cos(m*\theta), (r-n*\Delta r)\sin(m*\theta))$, where P is a resolution of a print target, r is a radius of the largest inscribed circle, $\theta$ is a central angle formed by two adjacent sampling positions on a same circumference. When central angles formed by any two adjacent sampling positions on any circumference are equal, $\theta=360°/N$. $\Delta r$ is a distance between two adjacent circumferences, and when differences between radii of any two adjacent circumferences are equal, $\Delta r=25.4/P$, m and n are integers, $0 \leq m \leq N$ and $0 \leq n \leq r*P/25.4$.

When selecting a same number of the sampling positions on all circumferences and performing sampling to acquire the same number of the sample points, since the closer to the center of the circumference, the denser the sampling positions, and it is even possible that multiple sample points coincide, in order to avoid the above cases, a process of selecting the same number of sampling positions on all circumferences and performing sampling to acquire the same number of sample points includes, if a data point sampled is a data point that has been sampled, the sample point is a blank point, where at the blank point, a printing head does not execute a printing operation.

In this way, it is possible to avoid resampling of same data points.

A second sampling manner includes selecting different numbers of sampling positions on all circumferences and performing sampling to acquire different numbers of sample points, i.e., the numbers of sampling positions and sample points on all circumferences are different.

In some embodiments, along a radial direction of the largest inscribed circle, a variation trend of numbers of the sampling positions selected on all circumferences is consistent with a variation trend of radii of the all circumferences. Namely, along a direction pointing from a circumference having the largest inscribed circle to a center, radii of all circumferences decrease, and the number of sampling positions selected on corresponding circumferences also decrease accordingly. In this way, when sampling on a circumference close to the center, it is possible to avoid coincidence of data points caused by excessive sample points.

In some embodiments, along the radial direction of the largest inscribed circle, the number of sampling positions selected on each circumference is proportional to a radius of the circumference. In some embodiments, for each circumference, the number of the sampling positions selected on the circumference can be $N=2\pi r'*P/25.4$. In this case, for each sampling position, a coordinate of the sampling position is $((r'-n*\Delta r)*\cos(m*\theta), (r'-n*\Delta r)\sin(m*\theta))$, where P is the resolution of the print target, r' is a radius of a circumference corresponding to each circumference. θ is a central angle formed by two adjacent sampling positions on a same circumference, and when central angles formed by any two adjacent sampling positions on any circumference are equal, θ=360°/N. Δr is a distance between two adjacent circumferences, and if a differences between radii of any two adjacent circumferences are equal, Δr=25.4/P, where m and n are integers, 0≤m≤N, and 0≤n≤r*P/25.4.

In above sampling manners, an arrangement manner of the second bitmap image in the step S102 can be S1021: rearranging the sample points in such a way that sample points located on a same circumference are arranged in one row and sample points located on different circumferences and located in a same radial direction of a largest inscribed circle of the first bitmap image are arranged in one column, so as to form the second bitmap image, and when central angles formed by two adjacent sample points on any circumference are equal, arranging each sample points on a same circumference in one row and arranging sample points located on different circumferences and with a same angle in one column, so as to form a second bitmap image.

In some embodiments, the step S1021 can be rearranging the sample points in such a way that sample points located on the same circumference are arranged in one row and the sample points located on different circumferences and located in the same radial direction of the largest inscribed circle are arranged in one column, so as to form the second bitmap image of M*N, where M indicates a row, N indicates a column, and M and N are positive integers.

The above method also includes, when the number of sample points in each row is smaller than N, supplementing one or more blank points such that a sum of the number of the one or more blank points and the number of the sample points in this row is equal to N, and at each of the one or more blank points, the printing head does not execute an inkjet printing operation.

In some embodiments, supplementing the one or more blank points can be executed in one of the following manners supplementing the one or more blank points after the sample points; supplementing the one or more blank points before the sample points; and arranging the sample points and the one or more blank points alternately.

In another embodiment, a specific manner for executing the step S101 is as follows: dividing the first bitmap image into a multiple radii, and selecting the sampling positions on each radius along the radial direction of the largest inscribed circle and performing sampling to acquire the sample points, where each radius is a radius of the largest inscribed circle of the first bitmap image, i.e., the regions of the step S101 are selected as the radii of the largest inscribed circle of the first bitmap image, and each radius is sampled respectively.

Among selected sampling positions, the numbers of the sampling positions selected on different radii can be equal or unequal. In some embodiments, the numbers of the sampling positions selected on different radii are equal, and the number of the sampling positions on one radius can be k=r*P/25.4, where r is a radius of the largest inscribed circle and P is the resolution of the print target.

On a same radius, distances between any two adjacent sampling positions can be equal or unequal. The central angles formed by two sampling positions located on any two adjacent radii can be equal or unequal. In this case, a coordinate of the sampling position is ((r−n*Δr)*cos(m*θ), (r−n*Δr)*sin(m*θ)), where P is the resolution of the print target and r is a radius of the largest inscribed circle, θ is a central angle formed by two sampling positions which are located on two adjacent radii and whose sampling positions have equal distances from the center of the largest inscribed circle. When central angles formed by two sampling positions on any two adjacent radii are equal, θ=360°/N. Δr is a distance between two adjacent sampling positions on a same radius, and when distances between any two adjacent sampling positions on a same radius are equal, Δr=25.4/P, where m and n are integers, 0≤m≤N, and 0≤n≤k.

Correspondingly, in this sampling manner, a second bitmap image is formed in such a way that all sample points in the same radial direction of the largest inscribed circle are arranged in one column and all sample points which are located at different radii and whose sampling positions have equal distances from the center of the largest inscribed circle are arranged in one row.

No matter which manner is used to sample and form the second bitmap image, there can be no corresponding data points at some sampling positions. In this case, processing method for data on the image further includes, if there is no data point at a sampling position, selecting at least one neighboring point of a region where the sampling position is located as the sample point, the neighboring point being a data point located in at least one side of the region above.

In some embodiments, the neighboring point can be a data point that is closest to the sampling position among data points located in a region where the sample point is located, or the neighboring point is a data point obtained by any one of following manners: a data point at a coordinate position obtained by rounding a coordinate of the sampling position, a data point at a coordinate position obtained by rounding-up or rounding-down a coordinate of the sampling position, a data point at a coordinate position obtained by weighting coordinates of positions where multiple neighboring points are located. For example, a coordinate of the sampling position is (1.3, 2.6), and if the coordinate is (1, 3) after using a rounding method, the neighboring point is a data point at the coordinate (1, 3); if the coordinate is (1, 2) obtained by rounding-down, the neighboring point is a data point at the coordinate (1, 2); if the coordinate is (2, 3) obtained by rounding-up, the neighboring point is a data point at the coordinate (2, 3). It is also possible to select the coordinates of multiple neighboring points near the sample point and use the weighted average method typically used in mathematics to calculate a data points at the obtained coordinates.

In the following, the present application will further explain the above method in different embodiments.

Embodiment 1

Figure 14:
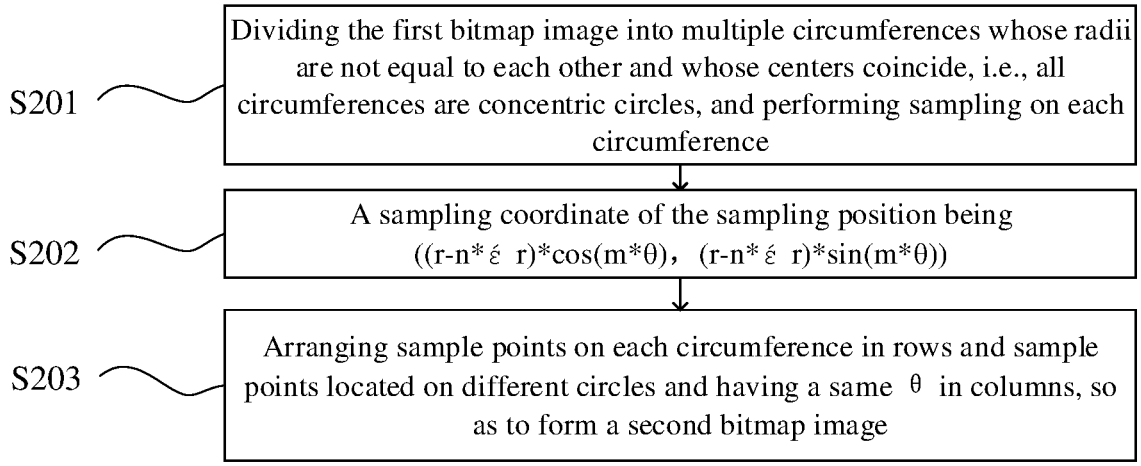
FIG. 14 is a flowchart of an image data processing method provided by Embodiment 1.

In an embodiment of the present application, referring to FIG. 14, the processing method for data on image provided by the present embodiment includes S201, pre-sampling processing: dividing the first bitmap image into multiple circumferences whose radii are not equal to each other and whose centers coincide, i.e., all circumferences are concentric circles, and performing sampling on each circumference.

In some embodiments, referring to FIG. 4, the first bitmap image 1 includes a first circumference C1, a second circumference C2, a third circumference C3, and a fourth circumference C4. The first circumference C1 is the largest inscribed circle of the first bitmap image 1. The first circumference C1, the second circumference C2, the third circumference C3, and the fourth circumference C4 have a same center but have unequal radii, and sampling is executed on circumferences of different radii respectively.

S202, sampling processing, the number of sampling positions on each circumference is N, N is a constant value, and N=2πr*P/25.4, where P is a resolution of a print target, r is a radius of the largest inscribed circle in the first bitmap image. A sampling coordinate of the sampling position is ((r−n*Δr) cos(m*θ), (r−n*Δr) sin(m*θ)), where θ is a central angle formed by two adjacent sampling positions on a same circumference, and Δr is a distance between two adjacent circumferences. On any one circumference, central angles formed by any two adjacent sampling positions are equal, and when differences between radii of any two adjacent circumferences are equal, θ and Δr are each constant values, θ=360°/N, Δr=25.4/P, m and n are integers, 0≤m≤N, and 0≤n≤r*P/25.4.

Figure 5:
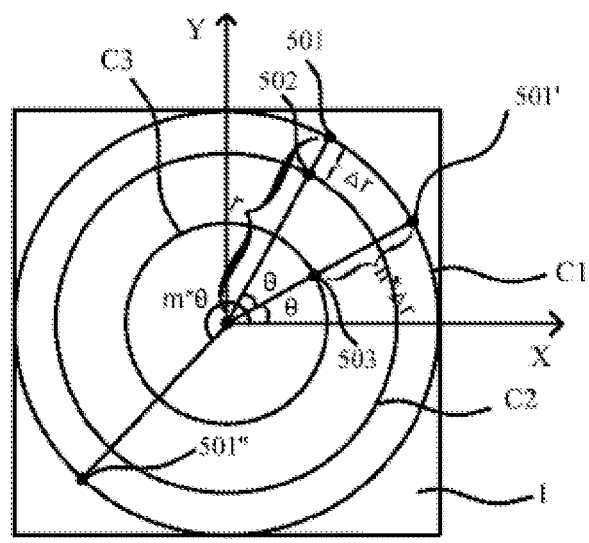
FIG. 5 is a schematic diagram of sampling coordinates of sampling positions in Embodiment 1.

In some embodiments, referring to FIG. 5 where the first bitmap image 1 includes a first circumference C1, a second circumference C2, and a third circumference C3, the first circumference C1 is the largest inscribed circle of the first bitmap image 1, and its radius is r. The second circumference C2 is a circumference adjacent to the first circumference C1, and a distance between the two is Δr. The third circumference C3 is a circumference adjacent to neither the first circumference C1 nor the second circumference C2, and a distance between the third circumference C3 and the first circumference C1 is n*Δr. Sampling is executed on circumferences of the first circumference C1, the second circumference C2, and the third circumference C3, respectively, and N sampling positions are respectively selected on the first circumference C1 and the second circumference C2 to sample. Among the selected sampling positions, a first sampling position 501 and a second sampling position 502 are respectively two adjacent sampling positions on the first circumference C1 and the second circumference C2, and a distance between the two is Δr. The first sampling position 501 and a third sampling position 501' are two adjacent sampling positions on the first circumference C1, and a central angle formed by the two is θ. The third sampling position 501' and a fourth sampling position 501" are two non-adjacent sampling positions on a same circumference, and a central angle formed by the two is (m−1)*θ. The third sampling position 501' and a fifth sampling position 503 are two non-adjacent sampling positions located on different circumferences and located on a same radius of the largest inscribed circle, and a distance between the two is n*Δr. According to FIG. 5, with a center and a X-axis as reference positions, sampling coordinates of the first sampling position 501, the third sampling position 501', and the fourth sampling position 501" on the first circumference C1 are respectively (r*cos 2θ, r*sin 2θ), (r*cos θ, r*sin θ) and (r*cos (m*θ), r*sin (m*θ)). A sampling coordinate of the second sampling position 502 on the second circumference C2 is ((r−Δr)*cos 2θ, (r−Δr)*sin 2θ). A sampling coordinate of the fifth sampling position 503 on the third circumference C3 is ((r−n*Δr)*cos θ, (r−n*Δr)*sin θ).

Figure 6:
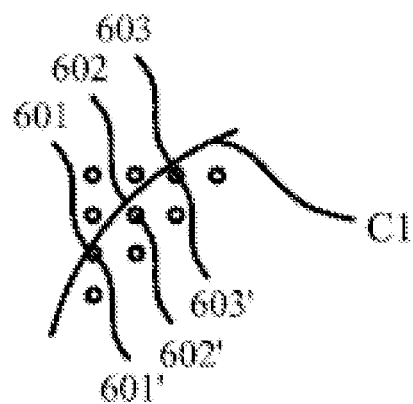
FIG. 6 is a schematic diagram showing a positional relationship between sampling coordinates and data points in Embodiment 1.

In some embodiments, referring to FIG. 4, when sampling on the first circumference C1 or other circumferences, its sampling position coordinate does not necessarily have a data point for sampling at the corresponding position in the first bitmap image 1. Referring to FIG. 6, a sixth sampling position 601, a seventh sampling position 602, and an eighth sampling position 603 are provided on one segment of the first circumference C1, and in the first bitmap image 1, there are only a sixth data point 601' and an eighth data point 603' which are corresponding to the sixth sampling position 601 and the eighth sampling position 603, while there is no data point provided at the seventh sampling position 602. Therefore, sampling is executed around the seventh sampling position 602. In some embodiments, a seventh data point 602' closest to the sampling position is sampled as the data point of the seventh sampling position 602. In this case, the seventh data point 602' is a neighboring point of the seventh sampling position 602.

Alternatively, the neighboring point of the seventh sampling position 602 can be obtained by a following algorithm: adjusting a sampling coordinate of the seventh sampling position 602 to a coordinate of the neighboring data point, and then sampling. An adjusting method of the sampling coordinate can be rounding, or rounding-up or rounding-down, or weighting calculating, or similar algorithms.

S203, post-sampling processing includes rearranging the sample points in such a way that sample points on each circumference are arranged in rows and sample points located on different circumferences and having a same θ are arranged in columns, i.e., sample points located on a same circumference are arranged in one row and sample points located on different circumferences and having the same θ are arranged in one column, so as to form a second bitmap image.

In theory, the data points on the first bitmap image 1 can be sampled and can only be sampled once, so that it is possible to achieve an object that the printing resolution at each position on a circular printing platform is consistent. However, since above sampling coordinates do not correspond to the data points, the closer to the center, the fewer the data points available for sampling. In some embodiments, the numbers of the sample points on all circumferences having different radii are all N, so there will be multiple sample points being a same one, i.e., one data point on the first bitmap image 1 is sampled multiple times.

Figure 7:
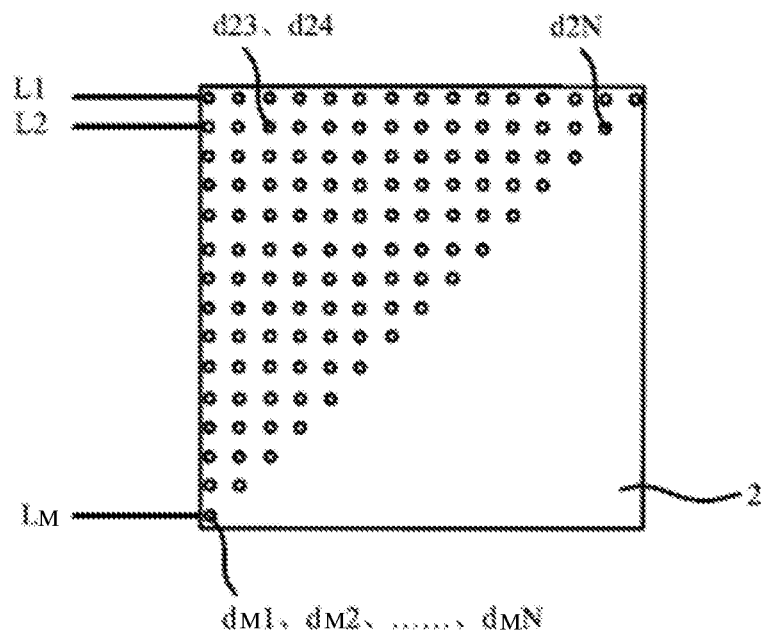
FIG. 7 is a schematic diagram of a second bitmap image before replacing resample points with blank points in Embodiment 1.

In order to visually represent the above case, referring to FIG. 7, a second bitmap image 2 formed by rearrangement is shown. Each row is formed by arranging sample points on a corresponding circumference. In the drawing, a first row L1 illustrates all sample points d1, d2, . . . , dN on the largest inscribed circle, and there are N sample points in total. A second row L2 illustrates all sample points d21, d22, . . . , d2N on an adjacent circumference to the largest inscribed circle, and there are N sample points in total, where d23 and d24 are sample points on a resampling position, and d23 and d24 are overlapped. By analogy, an a Mth row LM illustrates sample points dM1, dM2, . . . , and dMN on a smallest circumference, and there are N sample points in total, where dM1, dM2, . . . , and dMN are sample points on a resampling position, and dM1, dM2, . . . , and dMN are overlapped.

Figure 8:
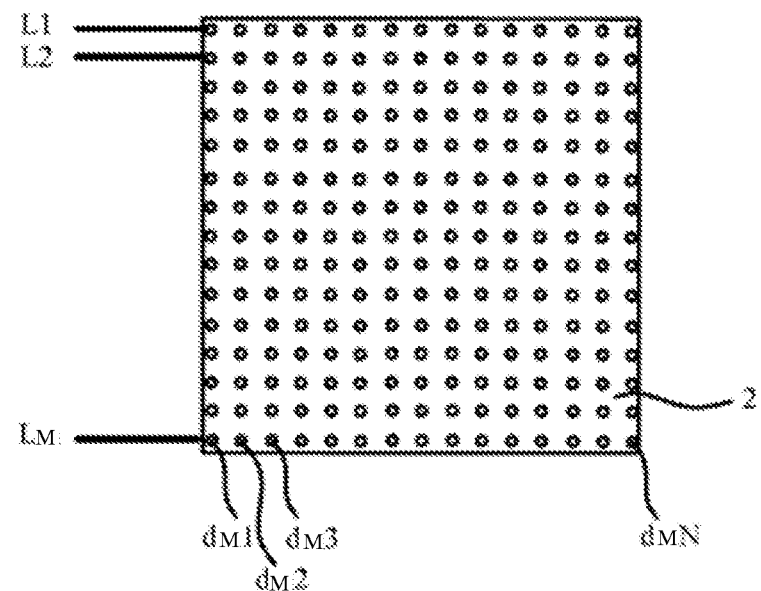
FIG. 8 is a schematic diagram of a second bitmap image after replacing resample points with blank points in Embodiment 1.

Therefore, the step S202 further includes processing sample points on resampling positions. When one data point on the first bitmap image 1, which has been sampled, is resampled subsequently, subsequent sample points are replaced by blank points. Referring to FIG. 8, a second bitmap image 2, in which a sample point on a resampling position has been replaced by a blank point, is illustrated. From the first row L1 to the Mth row LM, each row consists of N sample points, and sampling coordinates of all sample points are not repeated between each other. For example, coordinates of the sample points dM1, dM2, dM, . . . , and dMN in the Mth row LM are not repeated between each other.

Embodiment 2

Figure 15:
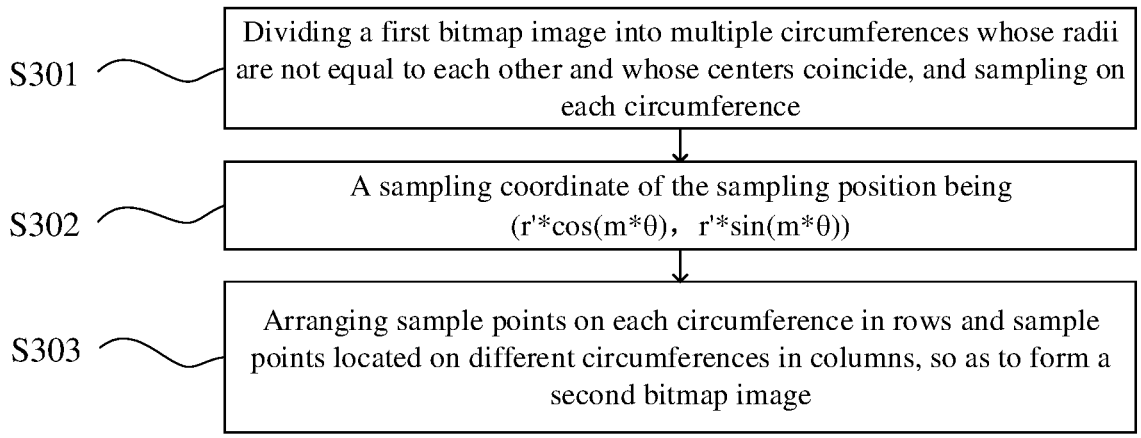
FIG. 15 is a flowchart of an image data processing method provided by Embodiment 2.

In another embodiment of the present application, referring to FIG. 15, the processing method for data on an image provided by the present embodiment includes the steps of:

S301: pre-sampling processing: dividing the first bitmap image into multiple circumferences having different radii from each other and having an overlapping center, and respectively sampling on each circumference; and S302, sampling processing, the number of sampling positions on each circumference is $N=2\pi r'*P/25.4$, where P is the resolution of a print target and r' is a radius of a circumference corresponding to the circumference. A distance between two adjacent circumferences (i.e., a difference between radii of two adjacent circumferences) is $\Delta r$, and when differences between radii of any two adjacent circumferences are equal, $\Delta r=25.4/P$. A sampling coordinate of the sampling position is $(r' \cos(m*\theta) \sin(m*\theta))$, where $\theta$ is a central angle formed by two adjacent sampling positions on a same circumference. When the central angles formed by any two adjacent sampling positions on any one circumference are equal, $\theta=360°/N$, where m is an integer, and $0 \leq m \leq N$.

In some embodiments, referring to FIG. 6, for each sampling position, a sampling coordinate of the sampling position does not necessarily have a data point for sampling at a corresponding position in the first bitmap image 1, and a principle and a specific implementation manner are already given in Embodiment 1, which will not be repeated herein.

In some embodiments, the step S302 further includes processing of sample points of repeated coordinates. An implementation manner is already given in Embodiment 1, which will not be repeated here.

S303, post-sampling processing includes arranging sample points on each circumference in rows, the number of the sample points on each row being the number of the sample points on a circumference of a inscribed circle, the row which has an insufficient number being compensated by inserting blank points, and arranging sample points on different circumferences in one column, i.e., arranging sample points on a same circumference in one row, and arranging sample points located on different circumferences and having a same $\theta$ value in one column, so as to rearrange the sample points to form a second bitmap image.

Figure 9:
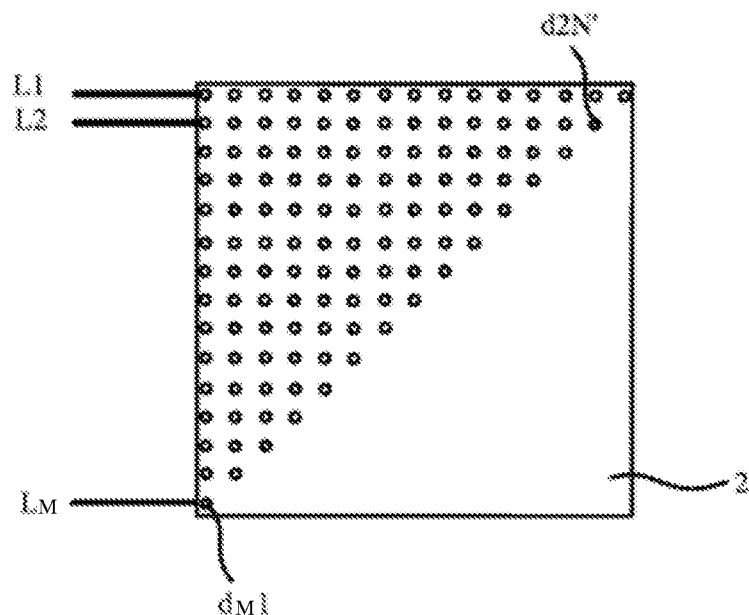
FIG. 9 is a schematic diagram of a second bitmap image in which no blank point is used for compensation in Embodiment 2.

In some embodiments, a difference between the present embodiment and Embodiment 1 lies in that in the present embodiment, N is not a constant value. The numbers N of sampling positions on different circumferences are different from each other, and a ratio of the numbers of sampling positions on different circumferences is equal to a ratio of radii of circumferences on which they are located. Referring to FIG. 9, a second bitmap image 2 formed by rearrangement is illustrated. Each row is formed by arranging sample points on a corresponding circumference. In the drawing, a first row L1 is formed by the sample points d1, d2, . . . , and dN on the largest inscribed circle, and there are N sample points in total. A second row L2 is formed by sample points d21, d22, . . . , and d2N' on an adjacent circumference to the largest inscribed circle, and there are N' sample points in total. By analogy, an Mth row LM is formed by a sample point dM1 on a smallest circumference, and there is one sample point in total. As shown in FIG. 9, the formed second bitmap image 2 is an incomplete rectangular bitmap image, so the second bitmap image 2 is complemented into a complete rectangular bitmap image.

Therefore, the present application also provides a method for solving a problem of an insufficient number of the sample points, in which the compensation is achieved by inserting blank points. Referring to FIG. 8, a second bitmap image 2 in which insufficient sample points have been compensated by blank points is shown, and from the first row L1 to the Mth row LM, each row consists of N sample points. In some embodiments, a manner for inserting the blank point can be a regular insertion or a random insertion. Optionally, the blank point is supplemented behind the sample point, for example, in the LM row, N−1 blank points are supplemented behind the data point dM1; or the blank point is supplemented in front of the sample point, for example, in the LM row, N−1 blank points are supplemented in front of the data point dM1; or the sample points and the blank points are arranged alternately, for example, in one row having a total of eight data, there are four sample points and four blank points, and the four sample points and the four blank points are arranged alternately.

Embodiment 3

Figure 16:
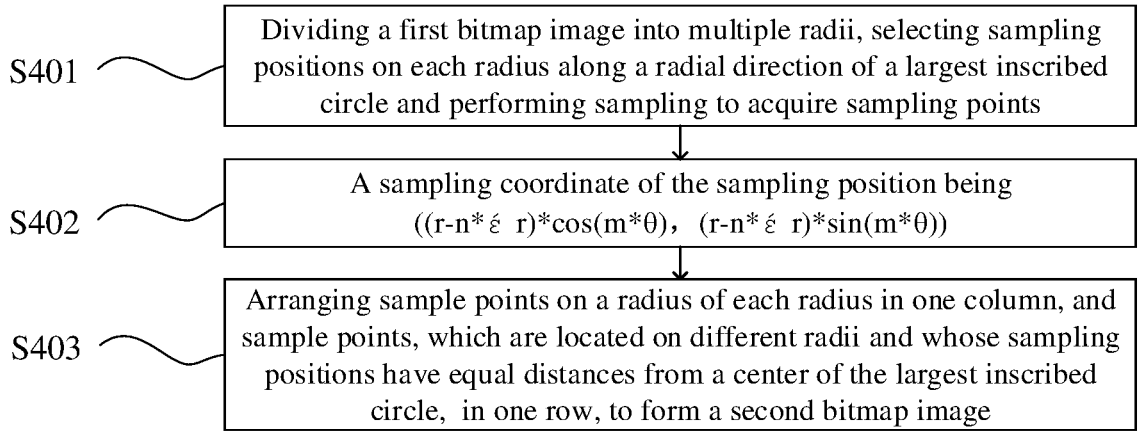
FIG. 16 is a flowchart of an image data processing method provided by Embodiment 3.

In another embodiment of the present application, referring to FIG. 16, the processing method for data on an image provided in the present embodiment includes the steps of:

S401: pre-sampling processing: dividing a first bitmap image into multiple radii, selecting sampling positions on each radius along a radial direction of the largest inscribed circle and performing sampling to acquire sample points, where each radius is one of radii of the largest inscribed circle of the first bitmap image. The number of the sampling positions selected on a circumference of the largest inscribed circle can be N, N is a constant value, and $N=2\pi r*P/25.4$, where r is a radius of the inscribed circle and P is the resolution of the print target; and S402, sampling processing: sampling along the radial direction of the inscribed circle. The number of sampling positions selected on each different radius is k. When the numbers of sampling positions on the all radii are the same, k is a constant value, $k=r*P/25.4$, and the sampling coordinate of the sampling position is $((r-n*\Delta r) \cos(m*\theta), (r-n*\Delta r)*\sin(m*\theta))$, where $\theta$ is a central angle formed by two sampling positions located on two adjacent radii and having a same distance from a center of the largest inscribed circle, $\Delta r$ is a distance between two adjacent sampling positions in a same radial direction. At any one of the radii, when distances between any two adjacent sampling positions are equal and a central angle formed by any two adjacent sampling positions are equal, both $\theta$ and $\Delta r$ are constant values, $\theta=360°/N$, $\Delta r=25.4/P$, m and n are integers, $0 \leq m \leq N$, and $0 \leq n \leq k$.

Figure 10:
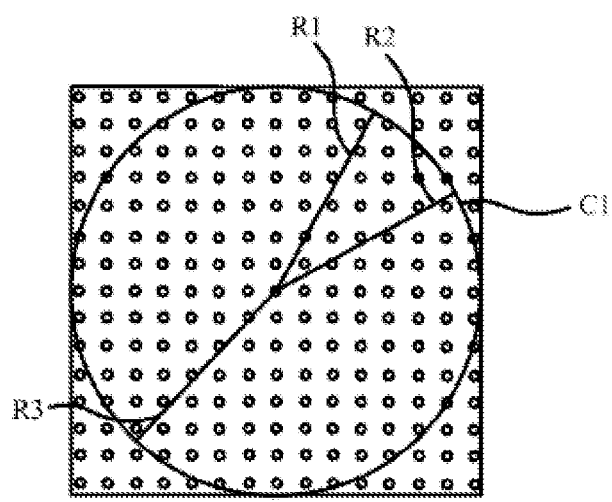
FIG. 10 is a schematic diagram illustrating dividing a first bitmap image into multiple radial directions to sample in Embodiment 3.
Figure 11:
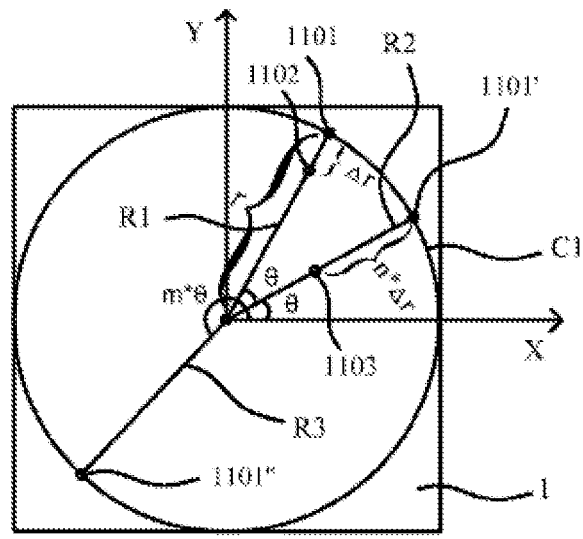
FIG. 11 is a schematic diagram of sampling coordinates of sampling positions in Embodiment 3.

In some embodiments, referring to FIGS. 10-11 where the largest inscribed circle C1 includes a first radius R1, a second radius R2, and a third radius R3, sampling is respectively executed on the first radius R1, the second radius R2, and the third radius R3, and the number of sampling positions on each radius is k. As shown in FIG. 11, in the drawing, a ninth sampling position 1101 and a tenth sampling position 1102 are two adjacent sampling positions on the first radius R1, and a distance between the two is $\Delta r$. The ninth sampling position 1101 and an eleventh sampling position 1101' are two adjacent sampling positions on the first radius R1 and the second radius R2 which are different radii, and a central angle formed by the two is $\theta$. The eleventh sampling position 1101' and a twelfth sampling position 1101" are two non-adjacent sampling positions on the second radius R2 and the third radius R3 which have different radii, and a central angle formed by the two is $(m-1)*\theta$. The eleventh sampling position 1101' and a thirteenth sampling position 1103 are two non-adjacent sampling positions on the second radius R2, and a distance between the two is $n*\Delta r$. According to FIG. 11, with a center of a circle and a X axis as reference positions, sampling coordinates of the ninth sampling position 1101 and the tenth sampling position 1102 on the first radius R1 are respectively (r*cos(2*θ), r*sin(2*θ)), ((r−Δr)*cos(2*θ), (r−Δr)*sin(2*θ)); sampling coordinates of the eleventh sampling position 1101' and the thirteenth sampling position 1103 on the second radius R2 are respectively (r*cos θ, r*sin θ), ((r−n*Δr)*cos θ, (r−n*Δr)*sin θ); a sampling coordinate of the twelfth sampling position 1101" on the third radius R3 is (r*cos(m*θ), r*sin(m*θ)).

Figure 12:
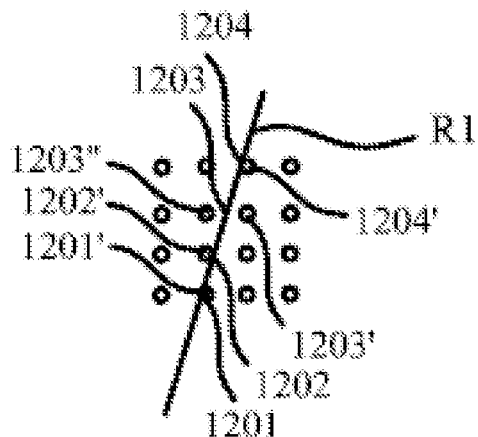
FIG. 12 is a schematic diagram showing a positional relationship between sampling coordinates and data points in Embodiment 3.

In some embodiments, when a coordinate of a sampling position does not necessarily have data point for sampling at a corresponding position in the first bitmap image, referring to FIG. 12, the first radius R1 has a fourteenth sampling position 1201, a fifteenth sampling position 1202, a sixteenth sampling position 1203, and a seventeenth sampling position 1204, and in the first bitmap image, only the fourteenth data point 1201', the fifteenth data point 1202', and the seventeenth data point 1204' correspond to the fourteenth sampling position 1201, the fifteenth sampling position 1202, and the seventeenth sampling position 1204, while there is no data point at the coordinate position of the sixteenth sampling position 1203 for sampling, so sampling is executed around the sixteenth sampling position 1203. A sixteenth data point 1203' or an eighteenth data point 1203' closest to the sixteenth sampling position 1203 can be selected as the data point of the sixteenth sampling position 1203. Other manners for selecting the data point of the sixteenth sampling position are given in Embodiment 1, which will not be repeated herein in the present embodiment.

S403, post-sampling processing includes rearranging the sample points in such a way that for each radius of the largest inscribed circle, sample points on the radius are arranged in one column, and sampling positions, which are located on different radii and whose sampling positions have equal distances from a center of the largest inscribed circle, are arranged in one row, to form a second bitmap image.

In some embodiments, the step S402 also encounters sample points having repeated coordinates. The principle and the implementation manner are given in Embodiment 1, which will not be repeated here in the present embodiment.

In a variation of the present application, the image of the present application can further include other bitmap images, i.e., an image of one slice layer can include multiple bitmap images, and the processing method for data on an image described in the present application is applicable to each of the bitmap images.

Embodiment 4

Figure 2:
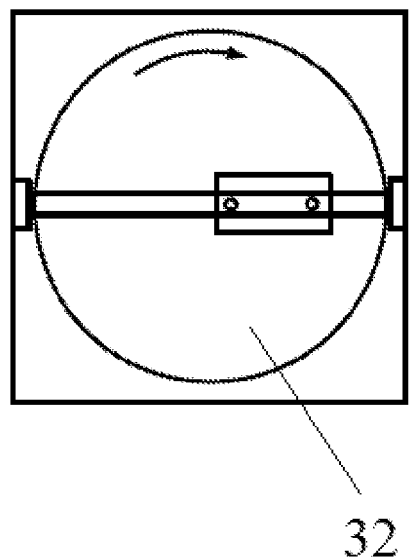
FIG. 2 is a structural schematic diagram of a novel 3D printer having a circular printing platform.
Figure 17:
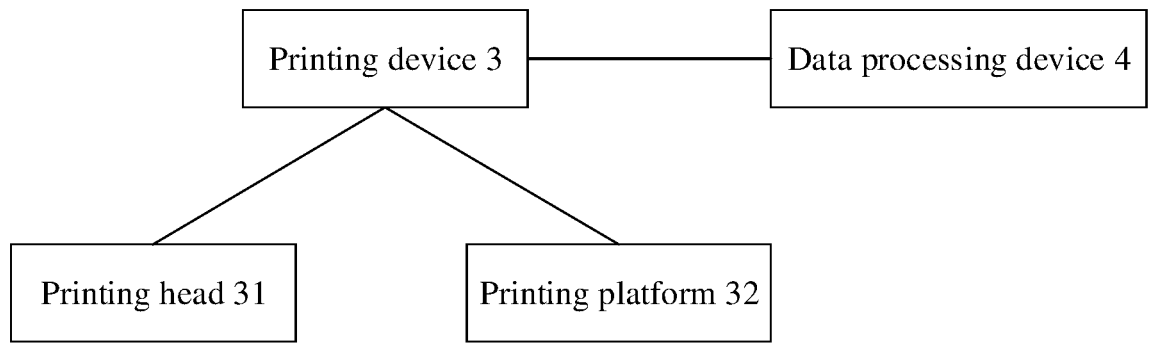
FIG. 17 is a structural schematic diagram of a printing system provided in Embodiment 4.

In addition, the present embodiment further provides a printing system, which can print using the processing method for data on an image described in any of the above embodiments. Referring to FIG. 17, the printing system includes a printing device 3 and a data processing device 4. The data processing device 4 is configured to divide the first bitmap image into multiple regions, select sampling positions in each region, perform sampling to acquire sample points, and rearrange the sample points to form a second bitmap image. The printing device 3 includes a printing head 31 and a printing platform 32, and the printing platform 32 is rotatable relative to the printing head 31 about an axis perpendicular to a printing surface, as shown in FIG. 2. The printing head 31 is configured to form a print object on the printing platform 32 in accordance with the second bitmap image.

The above are only some embodiments of the present application and are not intended to limit the present application. Various modifications and changes can be made to the present application by those skilled in the art. Any modifications, equivalents, improvements, etc., which are made within the spirit and principles of the present application, should be included in the scope of the present application.

What is claimed is:

1. A processing method for data on an image, applied in a printing technology, wherein the image comprises a first bitmap image, and the processing method comprises:
    dividing the first bitmap image into a plurality of regions, selecting sampling positions in each of the plurality of regions and performing sampling to acquire sample points; and
    rearranging the sample points to form a second bitmap image, the second bitmap image being different from the first bitmap image,
    wherein an execution manner for dividing the first bitmap image into the plurality of regions, selecting the sampling positions in each of the plurality of regions and performing sampling comprises:
    dividing the first bitmap image into a plurality of circumferences, selecting the sampling positions on each of the plurality of circumferences along a circumferential direction of the circumference and performing sampling to acquire the sample points; and
    wherein said rearranging the sample points to form the second bitmap image comprises:
    rearranging the sample points in such a manner that sample points located on a same circumference are arranged in one row and sample points located on different circumferences and located in a same radial direction of a largest inscribed circle of the first bitmap image are arranged in one column, so as to form the second bitmap image.

2. The processing method for data on the image according to claim 1, wherein among the plurality of circumferences, at most one of the plurality of circumferences coincides with a largest inscribed circle of the first bitmap image, and rest circumferences of the plurality of circumferences are located within the largest inscribed circle.

3. The processing method for data on the image according to claim 2, wherein the plurality of circumferences are concentric circles.

4. The processing method for data on the image according to claim 3, wherein differences in radii of every two adjacent circumferences of the plurality of circumferences are equal.

5. The processing method for data on the image according to claim 1, wherein on any one of the plurality of circumferences, central angles formed by any two adjacent ones of the sampling positions are equal.

6. The processing method for data on the image according to claim 1, wherein an execution manner for selecting the sampling positions on each of the plurality of circumferences and performing sampling to acquire the sample points comprises selecting a same number of sampling positions on each of the plurality of circumferences and performing sampling to acquire a same number of sample points.

7. The processing method for data on the image according to claim 6, wherein for each of the plurality of circumferences, a number of sampling positions on the circumference is N=2πr*P/25.4, where P is a resolution of a print target and r is a radius of a largest inscribed circle of the first bitmap image.

8. The processing method for data on the image according to claim 1, wherein an execution manner for selecting the sampling positions on each of the plurality of circumferences and performing sampling to acquire the sample points comprises selecting a different number of sampling positions on each of the plurality of circumferences and performing sampling to acquire a different numbers of sample points.

9. The processing method for data on the image according to claim 8, wherein when selecting a different number of sampling positions on each of the plurality of circumferences and performing sampling to acquire a different number of sample points, along a radial direction of a largest inscribed circle of the first bitmap image, a variation trend of numbers of sampling positions selected on the plurality of circumferences is consistent with a variation trend of radii of the plurality of circumferences.

10. The processing method for data on the image according to claim 9, wherein when selecting a different number of sampling positions on each of the plurality of circumferences and performing sampling to acquire a different numbers of sample points, for each of the plurality of circumferences, along the radial direction of the largest inscribed circle, a number of sampling positions selected on the circumference is proportional to a radius of the circumference.

11. The processing method for data on the image according to claim 10, wherein for each of the plurality of circumferences, the number of the sampling positions on the circumference is $N=2\pi r'*P/25.4$, where P is a resolution of a print target and r' is a radius of the circumference.

12. The processing method for data on the image according to claim 1, wherein said rearranging the sample points in such a manner that sample points located on a same circumference are arranged in one row and sample points located on different circumferences and located in a same radial direction of the largest inscribed circle are arranged in one column so as to form the second bitmap image comprises:
    rearranging the sample points in such a manner that the sample points located on the same circumference are arranged in one row and the sample points located on different circumferences and located in the same radial direction of the largest inscribed circle are arranged in one column, so as to form the second bitmap image of M*N, where M indicates a row, N indicates a column, and M and N are positive integers; and
    the method further comprises:
    supplementing one or more blank points when a number of sample points in each row is smaller than N, so that a sum of a number of the one or more blank points and the number of the sample points in the row is equal to N, wherein at each of the one or more blank points, a printing head does not execute an inkjet printing operation.

13. The processing method for data on the image according to claim 12, wherein said supplementing the one or more blank points when the number of the sample points in the row is smaller than N is executed in one of following manners:
    supplementing the one or more blank points after the sample points;
    supplementing the one or more blank points before the sample points; or
    arranging the sample points and the one or more blank points alternately.

14. The processing method for data on the image according to claim 1, wherein if a sampled data point is a data point that has been sampled, the sample point is a blank point, wherein at the blank point, a printing head does not execute an inkjet printing operation.

15. The processing method for data on the image according to claim 1, further comprising:
    if there is no data point at one of the sampling positions, selecting at least one neighboring point of a region where the sampling position is located as a sample point of the sampling position, the neighboring point being a data point located in at least one side of the region.

16. The processing method for data on the image according to claim 15, wherein the neighboring point is a data point obtained by any one of following manners:
    a data point at a coordinate position obtained by rounding a coordinate of the sampling position;
    a data point at a coordinate position obtained by rounding-up or rounding-down a coordinate of the sampling position; or
    a data point at a coordinate position obtained by weighting coordinates of positions where a plurality of neighboring points are located.

17. The processing method for data on the image according to claim 1, wherein the first bitmap image is a rectangular bitmap image; and the second bitmap image is a bitmap image uniformly distributing in each of the plurality of regions.

18. A printing system using the processing method for data on the image according to claim 1, the image comprising a first bitmap image, the printing system comprising a printing device and a data processing device, wherein the data processing device is configured to divide the first bitmap image into a plurality of regions, select sampling positions in each of the plurality of regions, perform sampling to acquire sample points, and rearrange the sample points to form a second bitmap image; and
    the printing device comprises a printing head and a printing platform, and the printing platform is rotatable relative to the printing head about an axis perpendicular to a printing surface;
    and the printing head is configured to form a print object on the printing platform based on the second bitmap image.

19. A processing method for data on an image, applied in a printing technology, wherein the image comprises a first bitmap image, and the processing method comprises:
    dividing the first bitmap image into a plurality of regions, selecting sampling positions in each of the plurality of regions and performing sampling to acquire sample points; and
    rearranging the sample points to form a second bitmap image, the second bitmap image being different from the first bitmap image,
    wherein an execution manner for dividing the first bitmap image into the plurality of regions, selecting the sampling positions in each of the plurality of regions and performing sampling lies in:
    dividing the first bitmap image into a plurality of radii, selecting the sampling positions on each of the plurality of radii along a radial direction of a largest inscribed circle of the first bitmap image and performing sampling to acquire the sample points, wherein each of the plurality of radii is a radius of the largest inscribed circle of the first bitmap image; and
    wherein said rearranging each of the sample points to form the second bitmap image comprises:
    forming the second bitmap image in such a manner that each sampling point in a same radial direction of the largest inscribed circle is arranged in one column and all sample points, which are located on different radii of the plurality of radii and whose sampling positions have equal distances from a center of the largest inscribed circle, are arranged in one row, so as to form the second bitmap image.

20. The processing method for data on the image according to claim 19, wherein when selecting sampling positions on each of the plurality of radii along the radial direction of the largest inscribed circle and performing sampling to acquire the sample points, numbers of sampling positions selected on different radii are equal.

21. The processing method for data on the image according to claim 20, wherein for each of the plurality of the radii, a number of sampling positions on the radius is k=r*P/25.4, where r is a radius of the largest inscribed circle and P is a resolution of a print target.

22. A printing system using the processing method for data on the image according to claim 19, the image comprising a first bitmap image, the printing system comprising a printing device and a data processing device, wherein the data processing device is configured to divide the first bitmap image into a plurality of regions, select sampling positions in each of the plurality of regions, perform sampling to acquire sample points, and rearrange the sample points to form a second bitmap image; and the printing device comprises a printing head and a printing platform, and the printing platform is rotatable relative to the printing head about an axis perpendicular to a printing surface; and the printing head is configured to form a print object on the printing platform based on the second bitmap image.

23. The processing method for data on the image according to claim 19, further comprising:

if there is no data point at one of the sampling positions, selecting at least one neighboring point of a region where the sampling position is located as a sample point of the sampling position, the neighboring point being a data point located in at least one side of the region.

24. The processing method for data on the image according to claim 23, wherein the neighboring point is a data point obtained by any one of following manners:

a data point at a coordinate position obtained by rounding a coordinate of the sampling position;

a data point at a coordinate position obtained by rounding-up or rounding-down a coordinate of the sampling position; or a data point at a coordinate position obtained by weighting coordinates of positions where a plurality of neighboring points are located.

* * * * *